(12) United States Patent
Richton (10) Patent No.: US 6,400,956 B1
(45) Date of Patent: Jun. 4, 2002

(54) METHOD AND APPARATUS FOR A WIRELESS TELECOMMUNICATION SYSTEM THAT PROVIDES LOCATION-BASED ACTION SERVICES

(75) Inventor: Robert Ellis Richton, Morris, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/440,048

(22) Filed: Nov. 15, 1999

(51) Int. Cl.[7] ............................. H04B 7/185; H04L 9/00
(52) U.S. Cl. .................. 455/456; 455/457; 379/102.01; 379/102.02; 379/102.03; 379/102.05; 379/102.06; 340/988; 340/989
(58) Field of Search .................. 379/102.01, 102.02, 379/102.03, 102.04, 102.05, 102.06, 93.24; 455/456, 457; 701/702; 340/988, 995, 990

(56) References Cited

U.S. PATENT DOCUMENTS

| 5,461,390 A | 10/1995 | Hoshen |
| 5,502,757 A | 3/1996 | Bales et al. |
| 5,559,520 A | 9/1996 | Barzegar et al. |
| 6,115,611 A | 9/2000 | Kimoto |

FOREIGN PATENT DOCUMENTS

| JP | 10-013961 | 9/2000 |
| WO | 97/41654 | 11/1997 |
| WO | 98/08314 | 2/1998 |
| WO | WO-98/08314 A1 * | 2/1998 |
| WO | 98/59506 | 12/1998 |
| WO | 99/33293 | 7/1999 |
| WO | 99/45732 | 9/1999 |
| WO | 00/41412 | 7/2000 |

* cited by examiner

Primary Examiner—Daniel Hunter
Assistant Examiner—Andrew T. Harry
(74) Attorney, Agent, or Firm—Harness, Dickey & Pierce, P.L.C.

(57) ABSTRACT

A wireless telecommunications system uses location or position information to initiate actions on behalf of travelers. As position information of a wireless mobile unit is received, it is compared to stored position information of a remote location, such as a home. As the traveler approaches his home, and gets within a certain distance of home, a signal is then sent to a controller within his home to perform an action or instruct the performance of an action.

64 Claims, 6 Drawing Sheets

METHOD AND APPARATUS FOR A WIRELESS TELECOMMUNICATION SYSTEM THAT PROVIDES LOCATION-BASED ACTION SERVICES

BACKGROUND OF THE INVENTION

1. Field of the Invention

The present invention relates to telecommunications in general, and, more particularly, to a wireless telecommunications system.

2. Description of Related Art

Figure 1:
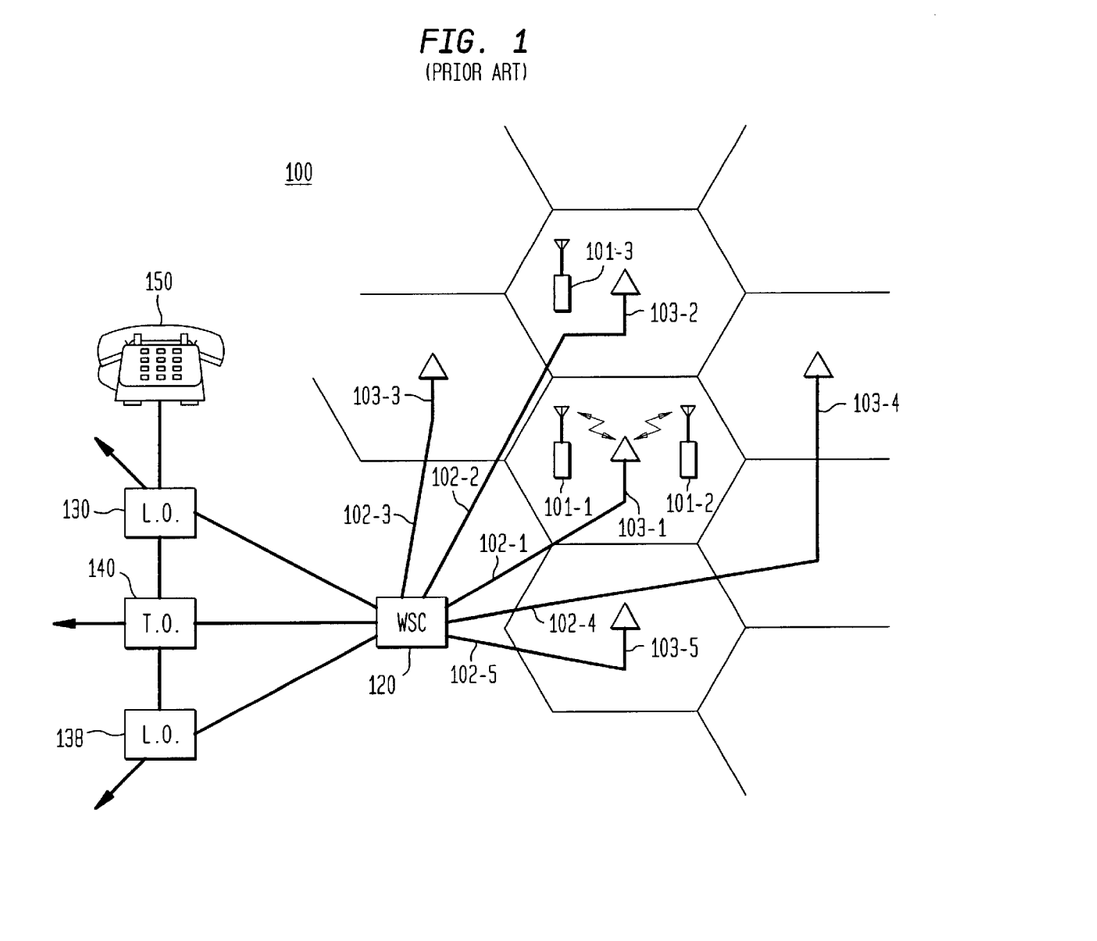
FIG. 1 is a schematic diagram of a known wireless telecommunications system.

FIG. 1 depicts a schematic diagram of a portion of a known wireless telecommunications system, providing wireless telecommunications service to a number of wireless mobile units (e.g., wireless mobile units 101-1 through 101-3) that are situated within a geographic region. The heart of a typical wireless telecommunications system is a wireless switching center ("WSC") 120. Typically, the WSC 120 is connected to a plurality of base stations (e.g., base stations 103-1 through 103-5) that are dispersed throughout the geographic region serviced by the system and to the local and long-distance telephone and data networks (e.g., local-office 130, local-office 138 and toll-office 140). WSC 120 is responsible for, among other things, establishing and maintaining a call between a first wireless mobile unit and a second wireless mobile unit or, alternatively, between a wireless mobile unit and a wireline mobile unit (e.g., wireless mobile unit 150), which is connected to the system via the local and/or long-distance networks.

The geographic region serviced by a wireless telecommunications system is partitioned into a number of spatially distinct areas called "cells." As depicted in FIG. 1, each cell is schematically represented by a hexagon. In practice, however, each cell has an irregular shape that depends on the topography of the terrain surrounding the cell. Typically, each cell contains a base station, which comprises the radios and antennas that the base station uses to communicate with wireless mobile units in that cell and also comprises the transmission equipment that the base station uses to communicate with the WSC 120. However, locating wireless mobile units within a cell was often difficult.

Recently, global position systems (GPS) have been developed to the point where they are very cheap to implement. Thus, such systems may soon be prevalent in wireless mobile units to determine precise location thereof. In addition, in the area of wireless technology, assisted GPS is being developed to improve on normal GPS for position or location detection in wireless mobile units. Further, other known systems already exists (such as known triangulation methods) for precisely locating wireless mobile units. And still others are constantly being developed. Therefore, a need exists to create other uses for the location or position information of wireless mobile units.

Increasingly complex modem life leaves many people eager for means of simplifying their busy lives. Moreover, there is a tendency to enjoy automating even simple tasks-like automatic opening of garage doors. More and more, such automation is finding its way into homes and offices today. Actions such as turning on lights, ovens, heating/cooling systems, etc. are often done automatically in homes. Familiar systems like these are time based, i.e., based on times of the day. However, as people arrive in their homes at varying times due to irregular work hours, or arrive in their offices at varying times due to irregular home hours, a need exists for automating actions based on something other than time.

SUMMARY OF THE INVENTION

The present invention is directed to a wireless telecommunications system that uses location or position information to initiate actions on behalf of travelers. As position information is received, it is compared to position information of a remote location, such as a home. As the traveler approaches his home, and gets within a certain distance of home, a signal is then sent to a controller within his home to perform an action or instruct an action. These actions can include varying temperature within the home, for example.

BRIEF DESCRIPTION OF THE DRAWINGS

The present invention will become more fully understood from the detailed description given hereafter and the accompanying drawings which are given by way of illustration only, and thus are not limiting of the present invention, wherein like reference numerals represent like elements and wherein.

DETAILED DESCRIPTION

The illustrative embodiment of the present invention enables the use of both the telecommunications capability and the location-finding capability of a wireless telecommunications system. These capabilities are combined to drive actions in the users home, office, or other specified location. In general, the illustrative embodiment performs two fundamentally distinct steps. In accordance with the first step, the movement of a wireless mobile unit is located and an incoming data stream of the user's location is maintained. In accordance with the second step, the illustrative embodiment sets geographically based criteria, at the direction of the user, by which location-based actions are imposed. When the geographically based criteria are met, the wireless system initiates processes resulting in location-dependent actions.

Figure 2:
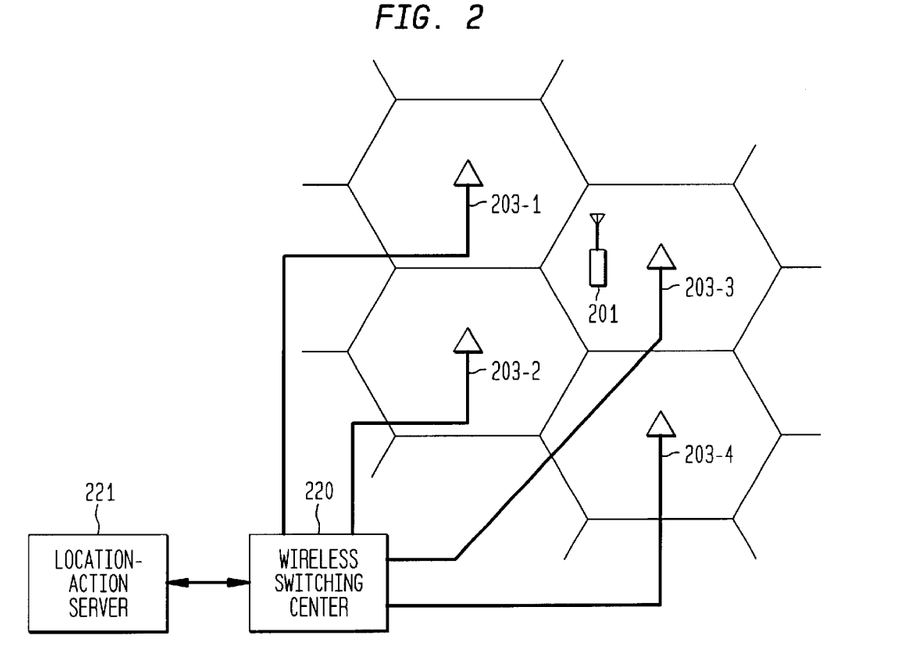
FIG. 2 is a schematic diagram of a wireless telecommunications system including the location-action server of an embodiment of the present invention.

FIG. 2 is a schematic diagram of a wireless telecommunication system including the location-action server 221 of a preferred embodiment of the present invention. The system includes a wireless switching center (WSC) 220 connecting the location-action server 221 with base stations 203-1 through 203-4, wherein it is understood that the number of base stations is exemplary only. Such a system is capable of: (1) providing wireless telecommunications service to wireless mobile unit 201, including location-based services based on location of the wireless mobile unit 201; (2) monitoring the movement (changing location) of wireless mobile unit 201 as it remotely travels; and (3) providing location-based actions based on the observed changing locations of wireless mobile unit 201. The location server 221 is responsible for providing all location-based action services for wireless mobile unit 201.

Figure 3:
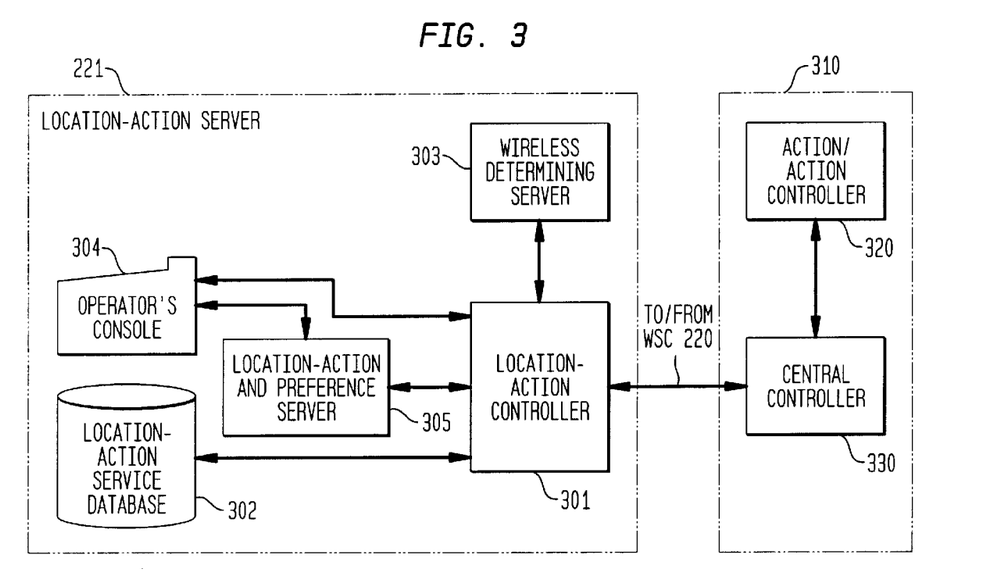
FIG. 3 is a block diagram of the salient components of the location action server of FIG. 2 in conjunction with components of a remote location for performing an action.

FIG. 3 is a block diagram of the salient components of location-action server 221. The location-action server 221 includes a location-action controller 301. The location-action controller 301 is connected to each of a location-action service database 302; location determining server 303; input device such as a console of an operator 304; and location action and preferences server 305. Location action and preferences server 305 is the part of the location-action server 221 that maintains a profile for each supported user and "understands" the actions that can be taken on behalf of users, e.g., opening a door, turn power onto a given appliance, etc. The location-action and preferences server translates actions from location-action service database 302 into simple commands that can be transmitted to the item/appliance that will perform the action. Further, the location-action and preferences server 305 "understands" the user's preferences (e.g., preference for turning appliances on when user has approached within 2 miles, and opening door when user has approached within 50 feet, for example). The location-action and preferences server 305 matches user's actions and preferences and maintains the user's specified actions and preferences as a user profile, to be invoked whenever the user calls for location-based action services.

Location-action controller 301 is, for example, a computer programmed to orchestrate location-based action services. Further, location-action controller 301 controls the operation of the other elements in location-action server center 221.

Location-action service database 302 is a database or memory that contains, among other things, digitized maps of geographic areas serviced by the location-action server 221 and WSC 220. These are used for comparison with a current location of a wireless mobile unit 201 to determine whether to impose the desired actions. The geographic data and related data may be embodied in a Geographic Information System (GIS), for example. Location-action service database 302 further preferably contains not only the GIS database, but also GIS processing software that enables geographic functions, chiefly determining proximity relationships that enable the functionality described herein as will be explained in more detail hereafter. Some personal preferences may also be established in location-action service database 302, which may create an understanding for the automated processing of concepts such as the home of the user of a wireless mobile unit 201; the user's, office, or other places that correspond to a set geographic area that will be conveniently referred to by such common labels as home/office hereafter.

Location-action service database 302 further preferably stores a list of actions to be performed in association with a designated wireless mobile unit 201 and the geographic area (distance/proximity thresholds) that will be considered to meet a criteria for initiating control of actions to be performed. These can be customized by the user. For example, actions performed when a user approaches/leaves his/her home/office include physical actions such as adjusting environmental conditions (e.g. temperature) and/or lighting, activating/deactivating a home security system, warming an oven, opening/closing garage doors, etc. (when the wireless mobile unit has satisfied a geographic relationship with the remote location, such as coming within a predetermined distance thereof, for example). Such actions are performed at the direction of a home-based central controller 330, such as a home computer (PC) for example. This central controller 330 performs the action, such as sorting email when a user is within 5 miles of his office for example, or directs another action/action controller 320 to perform the action. Any action which can be controlled by a remote signal (which necessarily includes an action performable by any electronic or electrical device) is contemplated to be within the scope of the present invention. This action/action controller 320 can be a controller of a thermostat, light switch, garage door opener, etc. Thus, a remote control system 310 includes a central controller 330 for actions performed directly thereon, such as email sorting for example, and optionally one or more action/action controller(s) 320. The central controller 330 of the remote control system 310 receives signals instructing performance/control of actions from location-action controller 301 through the WSC 220 and phone lines, either wireless or land-lines, connected to central controller 330 in a known manner.

Note that while central controller 330 may be employed at the location where these services are performed, its' presence is not essential to the methods disclosed herein. The increasing availability of "smart" appliances (e.g. internet enabled and addressable) make central controller 330 less necessary, especially in the future. Thus, it should be understood that remote control system 310 could include merely "smart" appliances themselves, with actions being directly controlled by location-action controller 301.

Location determining server 303 determines the location of a wireless mobile unit 201 when requested to do so by location-action controller 301 and provides location-action controller 301 with that information when it is obtained. The location of wireless mobile unit 201 can be determined in a number of known ways including global positioning systems (GPS) and assisted GPS used in conjunction with wireless mobile units, and other known techniques such as triangulation, for example. How the location information is obtained is not limitive of the present invention. Location-action controller 301, in conjunction with location-action and preference server 305, determines the identification of wireless mobile units for which location determining server 303 monitors and identifies position/location information.

Location-action and preference server 305 works in conjunction with location-action controller 301 to determine which wireless mobile units are to be monitored; what are location thresholds at which actions are to be performed; what actions are to be performed when thresholds are exceeded; etc. The functioning of location-action and preference server 305 includes the set-up and authorization of users and may use Wireless Intelligent network authorization procedures such as those used for set-up of other wireless services such as call-waiting, voice-activated dialing, etc. Details of the functioning of such service profiles will be familiar to those of ordinary skill in the art, as will there set-up, maintenance and termination. This can be a service that a wireless mobile unit user signs up for, for example. The functioning of the location-action and preference server 305 further includes performing of threshold tests and invoking services, when appropriate, as will be described further with regard to FIGS. 4 and 5 and their accompanying explanations.

Operator's console 304 enables travelers (users) to call the location action server 221 to request a service or change of wireless mobile unit 201 in preference in a user's wireless service file, for example. Thus, stored actions/thresholds can be modified. Alternatively, the operator's console 304 could be replaced by automated processes, linked to menus in the wireless mobile unit 201 of the user, for example. Some of the functionality described above can be automated by using an understanding of related user preferences, such as the options for different output devices that the user may tie to his/her wireless service file, which may be located elsewhere in the wireless network.

Figure 4A:
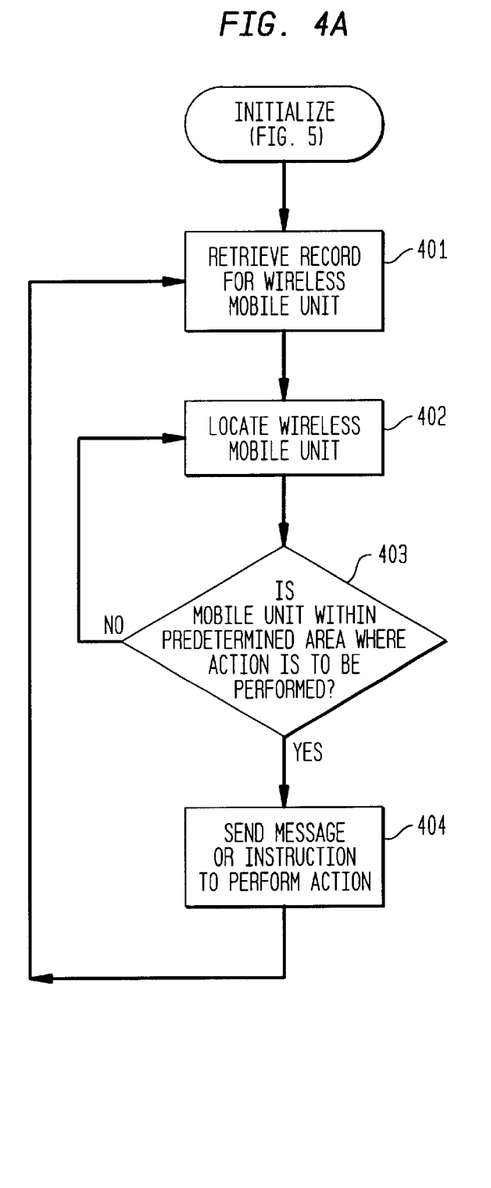
FIGS. 4a and 4b are flowcharts illustrating operation at the server and at the remote location.

FIG. 4a is a flowchart of the operation of an illustrative embodiment of the present invention, wherein position/location movement of a wireless mobile unit is tracked as it travels during a trip and wherein that information is then used in near real-time to initiate location-based actions. In doing so, the illustrative embodiment performs two fundamentally distinct, major steps: (1) specifying the desired services by the recording actions to be taken on behalf of the user and the geographic conditions under which those actions will be performed, and (2) the continuous monitoring of the user's location against the geographic criteria (threshold position for comparison) for the action: if the conditions are met the action will be performed; if conditions are not met, position/location monitoring will continue as long as the basis for the service remains.

Prior to step 401 in FIG. 4a, a user of a wireless mobile unit initially decides to subscribe to a location-based action service. The user must have a specific designatable location in mind (which will generally be a familiar location such as home or office or a friend's home, for example), and a specific action or set of actions to be performed at the designated location (it should be noted that the specific actions could be programmed in a home or office PC as will be described with regard to FIG. 6). These actions may be associated with routine events, such as coming to the office to begin the work day or coming home at the end of the work day. The actions are performed based on the fact that the user is about to be physically present at the designated location, i.e., the actions are performed when a user is within a certain distance of the designated location based upon a location of the wireless mobile unit which is with the user.

Additionally, prior to step 401 of FIG. 4a, the wireless network ascertains that the user is authorized for location-based action services-a step which implies the user has a wireless mobile unit that can be located routinely with little impact on the network. This will often be the case.

Initially, the process begins with step 401 of FIG. 4a wherein the process is initialized at the location-action server 221. Information regarding actions to be performed, locations at which actions are to be performed, threshold positions at which actions are to be initiated, etc., are stored at location-action server 221. Thus the user essentially subscribes for the service and defines the parameters. This process will be described in more detail with regard to FIG. 5.

Figure 4B:
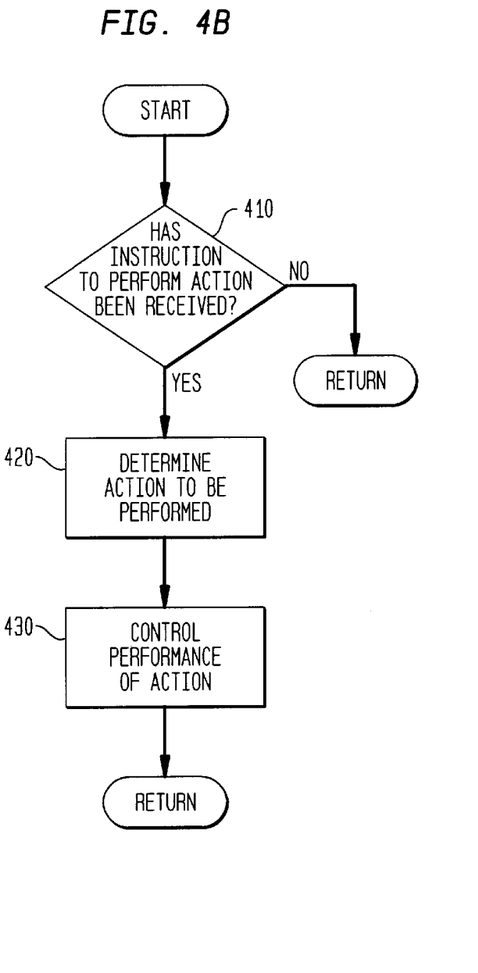
Figure 5:
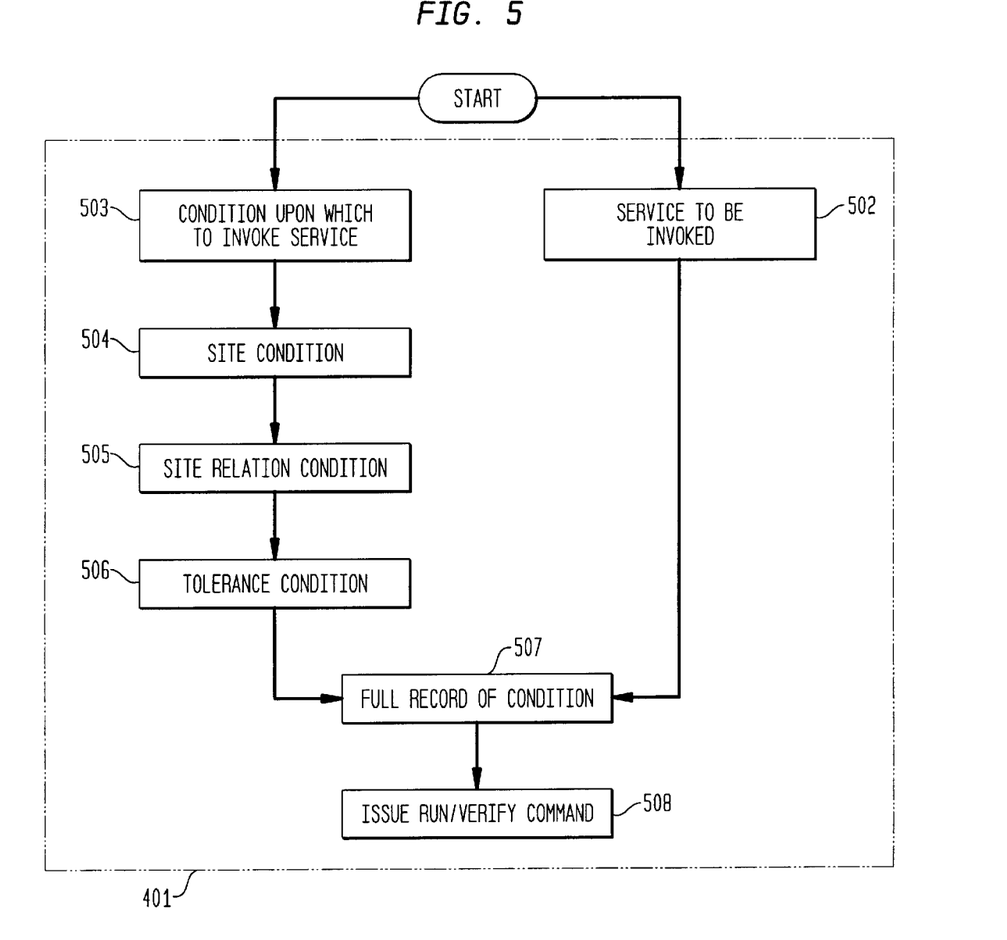
FIG. 5 is a flowchart depicting the registration steps involved in establishing a location-based action.

As previously stated, the steps involved in establishing parameters defining where, when, to whom, and what actions are to be performed are described in FIG. 5, further defining step 401 of FIG. 4. Initially, in step 502, the service to be involved is established. A user interface at the wireless mobile unit 201 might include other services, for example. The user invokes the location-based action service by initializing, either through a menu on his/her wireless mobile phone or through a similar mechanism such as that which could be provided over the Internet. Alternatives to invoking over the Internet include speaking to an operator or using an IPA (Intelligent Personal Agent). Those skilled in the art will recognize how to construct these various alternative devices for invoking/starting the service, but the menu interface is described further here.

Once in the menu for location-based actions, this user interface presents a list of actions and a list of locations, for example. In more advanced versions, nearly free-form inputs could exist, such that any action that could be understood by an intelligent module of the computer controlling the ultimate actions could be included. The list of actions include opening/unlocking a door, turning on equipment, raising or lowering temperature in the designated target location (such as home or office for example), or any other common actions. Actions ultimately performed in the designated target location within the scope of the present application include all actions which can commonly be driven simply by turning on power. For example, in the case where the actions are to be taken in a "smart home" (as will be described in more detail regarding FIG. 6), the home wiring is built such that all electric power outlets can be computer-controlled, and the home computer can be simply "told" to apply power at a given outlet/circuit or group ("macro") of outlet/circuits. The application of power will then open the garage door, turn on specified equipment, etc.

Besides specifying the action to be performed in Step 502, the user must specify the geographic conditions under which the service will be invoked in step 503. These are further defined in steps 504 and 506. This establishes the location where actions are performed; the "location-basis" under which actions are performed; and when actions are performed.

First the user specifies the designated site (target location) that is to be the basis of the action in step 504. The site may be chosen from a pre-programmed stored list, including such items as "home," "office," "secondary office," or "mother's house," etc. These sites, while using familiar names, will be translated by the location action controller 301 into street addresses, latitude/longitude, UTM (Universal Transverse Mercator), or a similar location designation scheme that can be dealt with by a Geographic Information System (GIS). This, and all other selected information is stored at location-action server 221, in a location-action service database 302.

The geographic criteria or relationship (threshold position/location at which actions are triggered) is set in Step 505 as the Site Relation Condition. The most common criteria will be proximity. For example, as a proximity threshold the user sets 5 miles such that when the wireless mobile unit 201 is within 5 miles of the designated target location (e.g., his home), then the determined geographic relationship with the designated target will be satisfied and an action will be triggered (e.g., adjust environmental conditions such as temperature or humidity). It should be noted that services could also include entry onto a particular road, municipality, or any geographic area as a triggering threshold for satisfying a geographic relationship. Conversely, it can include leaving any geographic area or reaching a certain distance away from an area or a specific location. Thus, when a user is leaving and is one mile from home, environmental conditions in the home can be automatically adjusted so as not to waste power. Many possible variations can be invoked, particularly if provisioned via a graphical interface such as that included in common GIS or Desktop Mapping schemes (see for examples, the ARC/Info products from ESRI of Redlands, Calif., or MapInfo from MapInfo, Inc, Troy, N.Y.).

Once the user has specified (1) the action to be taken (e.g. adjusting environmental conditions such as temperature), (2) the location wherein the action should be taken (e.g. "home"), and (3) the criteria or geographic relationship (typically distance within which to invoke the action such as "5 miles" from home, for example), the initialization is nearly complete. However, the system may require other internal settings. The most obvious of these is the tolerance, which can be set in step 506. By tolerance, for example, this refers to the fact that when specifying "perform this action when I am within 1 mile ±100 meters", the ± part is yet to be specified. Because of its subtlety, this part may be specified by the system rather than by the user, for example. The initialization Step 401 is completed by writing the Full Record of Condition in Step 507, which writes the information in Location Action Service Database 302. In step 508, it then indicates that the Location Action Controller 301 may begin its process of verification/authentication, and proceed to begin controlling the service.

Once the process has been initialized, the wireless network then monitors the location of the wireless mobile unit 201 of the user at regular intervals. Note the wireless mobile unit 201 may contain the functionality needed to locate itself, and may send results to the location service controller 301 (through a controlling base station and WSC 220); such as through GPS or modified GPS circuitry within the wireless mobile unit 201 itself. Alternatively, the location can be determined in a known manner through triangulation using base station information, etc., either at the location action server 221 or WSC 220. Those familiar with wireless location technology/functioning will recognize that for the services disclosed herein, it does not matter whether location results are calculated in the network or in the wireless mobile unit 201 itself.

For example, and as is clear to those skilled in the art, there are various ways in which the illustrative embodiment can ascertain the location of wireless mobile unit 201. For example, wireless mobile unit 201 can include a satellite position system receiver (e.g., a Global Positioning System (GPS) receiver, etc.) so that wireless mobile unit 201 can determine its own latitude and longitude. In such a case, wireless mobile unit 201 provides its location to a controlling base station, WSC 220, and eventually to location action server 221 when requested. An example of such an arrangement is taught in U.S. Pat. No. 5,479,482, entitled "Cellular Terminal For Providing Public Emergency Call Location Information," issued Dec. 26, 1995.

In accordance with another technique, wireless mobile unit 201 and location determining server 303 may share the task of computing the latitude and longitude of wireless mobile unit 201. In such a case, wireless mobile unit 201 provides an indicium of its location, through a controlling base station and WSC 220, to location determining server 303 of location action server 221 when requested. An example of such an arrangement is described by G. Vannucci and R. E. Richton in pending U.S. patent applications Ser. Nos. 08/927,432, and 08/927,434.

In accordance with other techniques, either wireless mobile unit 201 or base stations 203-1 through 203-4 use of terrestrial triangulation techniques, in a well-known fashion, determine the location of wireless mobile unit 201 based on the time-of-arrival or direction-of-arrival of signals transmitted from each other. It will be clear to those skilled in the art how to determine the location of wireless mobile unit 201 for the purposes of the present invention, and that the reporting of the location to location determining server 303 (from the base stations through WSC 220) at regular intervals requires merely adding a timer, for example. It will similarly be clear to those skilled in the art that wireless location determination systems will have a certain inherent accuracy, and that they generally report a confidence or uncertainty level and that that level might need to be considered when invoking any location-based service. Factoring in consideration of the areas of uncertainty will be part of any location-based service but will not be described at length here, as the considerations should be evident. For example, when criteria for invoking services are examined, the uncertainty/confidence must be considered. Depending on the nature of the action/service, different confidence levels might appropriately be invoked. However, because this is a secondary factor in invoking location-based action services, its use would probably be better left to the administrative parts of location-based services rather than set by users in most cases.

Following initialization of the service as explained in FIG. 5, the process may begin at Step 401 within the location-action server 221. In step 401, a record of the wireless mobile unit 201, the location criteria or geographic relationship (designated target, threshold, etc.) and the action to be taken is established. This information is stored in a record in a location action service database 302, in association with information identifying the wireless mobile unit 201 (such as it's phone number, for example) and in association with information identifying the target location where the actions are to be performed (such as the phone number of a user's office, home, etc.). It should be noted that the record stored in the location-action service database 302 may include all necessary information to carry out the instructing of the action, or may be linked to existing information, such as a known telephone number of the wireless mobile unit 201 and/or known home or office numbers of a user. The aforementioned record and other stored information may be stored in a geographically oriented database, such as are associated with GISs. Location action controller 301 records that such a record exists. At this point in the location-action controller 301 initiates the criteria checking shown in steps 402 and 403.

The criteria checking steps 402 and 403 are the heart of the system. In step 402, the location of wireless mobile unit 201 is continually determined/received. This is done at periodic intervals, e.g., once per second. Next, in step 403, the retrieved criteria are checked at regular intervals, typically timed to mesh with the timing of step 402. For example, in step 403 it is determined whether or not the location information received in step 402 indicates that the wireless mobile unit has satisfied the geographic relationship with the target location, e.g. is it within a threshold distance (e.g., 5 miles) of the target location (e.g., "home"). These two timed processes are "merged" in a manner to check whether the location of the wireless mobile unit of the user meets the criteria or geographic relationship with the target that has been set.

It should be noted that the record storage and criteria checking of steps 401-403 need not be limited to a single wireless mobile unit or to a single target location. For example, if a family has two wireless phones, for example, then they may designate that the actions take place when either of the two wireless phones meets the set geographic relationship. This can be set and stored in location-action service database 302. Further, one set of actions can be triggered by either wireless phone meeting a first geographic relationship with a home of the users, for example, and a second set of actions can be stored in association with only one of the wireless phones, for office related actions, for example.

In addition, for a single wireless mobile unit, multiple geographic relationships can be stored in association therewith, with similar or different actions to be performed. Thus, when a wireless mobile unit of a user satisfies a first set geographic relationship with a first target location (e.g. home), a first set of actions will be triggered at the home. When the same wireless mobile unit satisfies a second set geographic relationship with a second target location (e.g.

office), a second set of actions will be triggered at the office. Accordingly, upon the wireless mobile unit satisfying either of the set geographic relationships with either of the respective target locations, a controls signal will be sent to the respective target to trigger the respective action(s). Therefore, information identifying one or more various wireless mobile units can be stored in association with information of various target remote locations and in association with various set geographic relationships thereof and actions to be performed.

Further, it should be noted that the monitoring performed in step 402 can be provided to applications other than those in step 403. Further, step 402 can be performed using criteria established outside of step 401. Also note that there will be service provisioning steps that the providers of services described here will undertake before users can employ any steps in FIG. 4a. These provisioning steps would include, for example, initiate billing and check that the end-to-end communications protocols required for subsequent steps of the service disclosed are ready. Authentication/security functions may also be established to further protect users against unauthorized disclosures of data regarding their whereabouts (position/location), which many would want to keep private. Methods to perform such provisioning steps are well-known to those skilled in the art, as these are normal functions of public telephone networks for well-known services such as call waiting, caller-ID, etc.

If the criteria are met in step 403, a control signal or instruction to perform an action is sent in step 404. This is easily accomplished since the location-action server 221 knows the phone number of the remote location where the action is to be performed. If not, location of the wireless mobile unit 201 is monitored in step 402. As noted previously, the action is carried by the location action server 221 sending a pre-arranged control signal to the remote central computer 330, which in turn directly causes the action to occur (either at central controller 330 for computer actions such as sorting email, for example, or by controlling a remote action/action controller 320 such as a thermostat controller for adjusting environmental conditions such as temperature). If the criteria are not met, the condition is checked again (periodically).

In the case where the criteria is met in step 403, the location-action controller 301, having "deduced" that the criteria has been met by comparing the criteria stored in location-action database 302 with the most recent location determination result from the location determining server 303, sends a signal to invoke the action. This may include calling a specific telephone number (e.g., the home or office telephone number for the user). One of ordinary skill in the art familiar with this type of pre-programmed controller will recognize that a variety of signals may be used from this point to establish, validate, and invoke the computer-to-computer communications that enables this step (from location-action server 221 to the remote control system 310). The communications may take place via the Public Switched Telephone Network (PSTN) or any ordinary or extraordinary means.

The home/office computer (central controller 330) of remote control system 310 that receives the instructions to invoke the action is previously set up to acknowledge the received instruction. Upon receipt of a return acknowledgment, the location-action controller 301 will either cycle to the next service it performs on behalf of the particular user described here, or will stop the processes for that user. An external stop signal, either invoked by the user or a system administrator, can also stop the process at step 403. This external stop signal is typical of administrative steps that are not shown explicitly in the Figures, but whose presence is both required for a practical system and evident the those skilled in the art.

FIG. 4b is a flowchart illustrating the steps performed at the designated target location, such as at the user's home. Initially, a central controller 330 of remote control system 310 monitors whether or not an instruction to perform an action has been received in step 410. If no instruction has been received, the system merely continues to monitor for receipt of such a signal. However, if the signal has been received from location-action controller 310 of location-action server 221, through the phone lines (either land-line, or wireless) in step 420 it determines which actions are to be performed based on the signal received. Thereafter, in step 430, the central controller the performance of the action by either performing the action itself (if the action is a computer action such as sorting email, for example), or sends a signal to a remote device or controller of a device 320 to perform the action.

For example, if the action is adjusting temperature, a signal is sent to a thermostat controller, where the signal itself merely controls a thermostat so as to adjust the temperature. It should be noted that the specific parameters of adjusting the temperature or even specific actions to be taken at the remote control system 310 can be programmed therein, such as at the central controller 330 for example. Alternatively, some information could be prestored at location-action service database 302 of location-action server 221, such that a certain signal is sent when a user has departed his home by 1 mile and another signal is sent when a user has arrived within 5 miles of his home, with the actual action to be performed being stored in central controller 330. In such an instance, upon receiving an arrival signal from the location-action server 221, the central controller 330 can perform a first set of actions such as raising the temperature in the house, turning the lights on, opening the garage door, etc. If a second signal is sent from location-action server 221 indicating that a user has departed his home by a predetermined distance for example, then the central controller 330 can be programmed to perform a different set of actions, such as locking all doors, closing a garage door, lowering temperature in the house, closing a garage door, etc. It should be clear to those of ordinary skill in the art that all variations and permutations 10/6/99 thereof are also within the scope of the present invention.

Figure 6:
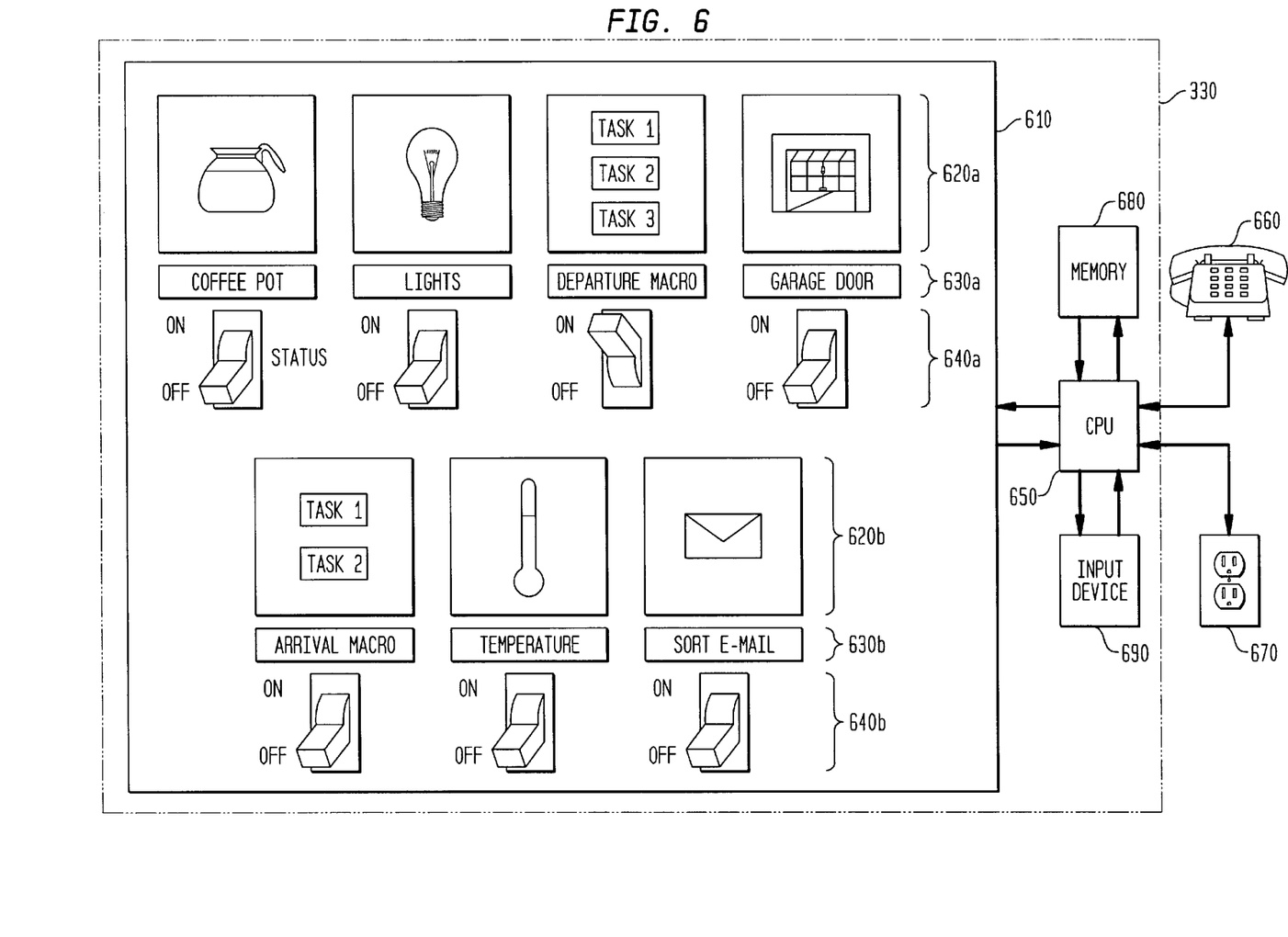
FIG. 6 illustrates the controller for controlling/performing exemplary actions.

FIG. 6 illustrates the central controller 330, in a preferred embodiment thereof As previously stated, such a central controller 330 can include, for example, a home computer. As such, the home computer will include a display portion 610, a CPU 650 connected to the display portion 610, and further connected to memory 680 and an input device 690. The CPU 650 is further connected via input port 660 to a phone line for receiving information from location-action controller 301 of location-action server 221, for example; and an output port 670 for outputting information to control the carrying out of various actions such as adjusting temperature, opening a garage door, turning on and off lights, etc. As previously stated, the specific actions to be performed can be programmed using CPU 650, memory 680, and input device 690 within the central controller 330 itself; certain groups of actions can be performed therein when a particular arrival or departure signal is received from location-action controller 301 of location-action server 221 for example; or specific instruction signals can be received by CPU 650 from location-action controller 301 of location-action server 221 dictating exactly which actions are to be performed or controlled by central controller 330.

FIG. 6 further illustrates specific elements displayed on display portion 610 of central controller 330, indicating which actions may be performed. It should be noted that the various actions indicated on display portion 610 of FIG. 6 are merely indicated illustrative purposes only and should not be deemed limiting of the present invention.

First display areas 620*a* and 620*b* may, for example, display a symbol indicating a particular action to be performed. The specific word or phrase corresponding to the symbol may optionally be displayed in area 630*a* and 630*b* for example. Further, in a separate display area 640*a* and 640*b*, it can be indicated whether or not a particular action is ON or OFF. By such a system, using display portion 610 as a touch screen for example, a user can easily program specific actions to be performed when a signal is received from a location-action controller 301 of a location-action server 221 in conjunction with the present application. Additionally, although not shown in FIG. 6, specific control of various actions can take place at the central controller 330 in a similar manner, such as setting the exact that the temperature the home should reach. These "variable parameters" of an action are probably best programmed at central controller 330.

Software for controlling various devices, such as a coffee pot, lights, etc. is known from companies such as Active Home™, which currently activate devices in the home based upon a particular time of day for example. Accordingly, similar programming is carried out in connection with the present invention, utilizing location information and external control from a location-action controller 301 of a location-action server 221 in place of the known "time of day" control. Accordingly, in a system wherein a user desires to determine which particular action should take place in his or her home when he is within a particular distance from the home (either arriving or departing), the use of a central controller 330 as shown in FIG. 6 is ideal. As such, a user can turn various actions ON so that when an arrival signal is received from location-action-action controller 301 of location-action server 221, several actions are performed. Alternatively, the user can cancel some actions if, for example, the user does not desire to turn the coffee pot ON each time he arrives; or can vary the parameters of certain actions (adjusting the temperature by 5 degrees instead of 3 degrees for example).

FIG. 6 also depicts an arrival macro and a departure macro. As such, a user can string a plurality of tasks together in a macro so that, for example, each time he leaves his house and exceeds the predetermined threshold, such as 1 mile for example, three tasks will be performed (i.e., the lights will be turned OFF, the temperature will be lowered, and the garage door will be shut). Similarly, an arrival macro can be determined and prestored such that when a user is within 5 miles of his home, for example, two tasks will be performed (such as raising the temperature by 5 degrees and turning the lights ON, for example). As such, the actions are more easily controlled by the user.

Figure 7A:
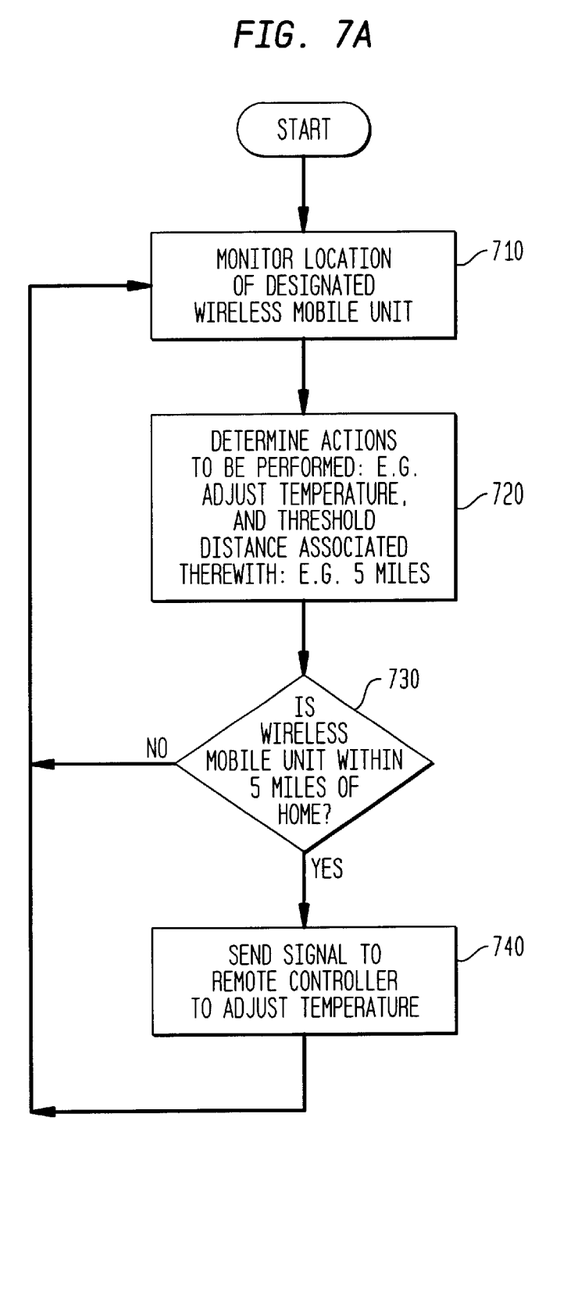
FIG. 7 illustrates an example of a location-based actions.
Figure 7B:
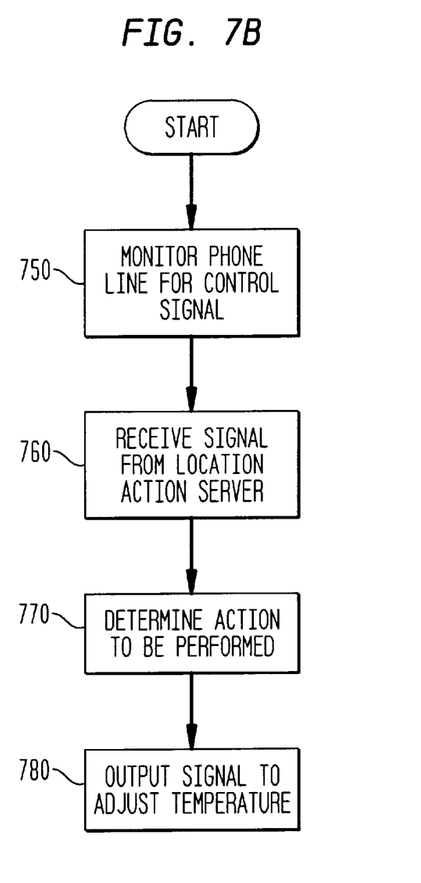

FIGS. 7*a* and 7*b* illustrate one particular example of the system of the present application. FIG. 7*a* indicating the steps performed at the location-action server 221; and FIG. 7*b* indicating the steps performed at the remote control system 310.

In step 710, a record for a wireless mobile unit 201 is retrieved and the location of the wireless mobile unit 201 is monitored. Thereafter, in step 720, actions to be performed are determined, such as adjusting temperature for example, and a threshold distance (as a set geographic relationship) along with the target location, is also determined (namely 5 miles from the home for example). Alternatively, instead of determining exactly which actions are to be performed, a threshold need merely be determined such that if the threshold is met, a signal will be sent from location-action controller to central controller 330 indicating that an action is to be performed; with the action itself being determined at the central controller 330 based upon receipt of an arrival or departure signal for example (such as in a departure/arrival macro).

Thereafter, in step 730, it is determined whether or not the wireless mobile unit 201 meets the threshold, namely is the wireless mobile unit 201 within 5 miles of the user's home, for example. If not, the system returns to step 710 and the location or position of the wireless mobile unit 201 is continually monitored. If so, the system moves to step 740 wherein a signal is sent to the central controller 330 of the user's home. This is done, for example, since the location-action controller 301 knows the home number of the user, stored in association with the telephone number of the wireless mobile unit 201. Thus, a signal can be sent to the user's home via the existing phone lines.

FIG. 7*b* illustrates the actions performed at the user's home, for example. Namely, the central controller 330 monitors the phone lines for a control signal from the location-action controller 301 in step 750. In step 760, a signal is received. Thereafter, in step 770, it determines which actions are to be performed, either from the received signal itself or from actions preprogrammed in the computer such as actions which are part of a stored departure macro or an arrival macro, as previously explained with regard to FIG. 6 for example. Thereafter, the action of adjusting the temperature (for example) is performed by the central controller 330 either controlling the temperature (action) itself, or sending a signal to an action controller 320, such as a thermostat controller, for adjusting the temperature. For temperature adjustment, and for other specific actions, exactly how much to adjust the temperature can be specifically stored, for example at the computer or central controller 330 of the user so as to be easily adjustable to the user. When a signal to adjust the temperature is received from the location-action controller 301, the computer can then determine how much to adjust the temperature and output a signal for appropriate control thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims. For example, the structure of location-action service data base 302 is not limiting and need only store, in some fashion, the required information. How information is stored is not limitive of the present invention. Further, the location of the various components of the location-action server 221 is not limitive of the present invention. The components can be in a single unit as shown in FIG. 3, or can be located apart from location-action controller 301. Only operative connection between the components is important. The location-action server 221 of FIG. 3 is merely a description of a preferred structure.

What is claimed:

1. A system, comprising:
   a first controller, adapted to receive information indicating position of a wireless communication device;
   a memory adapted to store information identifying the wireless communication device and position information of a remote location stored in association with the information identifying the wireless communication device; and a second controller, located at the remote location, adapted to initiate an action at the remote location upon receiving a control signal from the first controller, the first controller adapted to send the control signal to the second controller upon receiving a signal indicating that the position of the wireless communication device has satisfied a geographical relationship with the remote location.

2. The system of claim 1, wherein the geographic relationship is satisfied when the position of the wireless communication device is within a designated distance of the remote location.

3. The system of claim 1, wherein the second controller, upon receiving the control signal from the first controller, is adapted to initiate the action by outputting a signal to a device at the remote location.

4. The system of claim 3, wherein the second controller is adapted to output the signal to open/close a door at the remote location.

5. The system of claim 3, wherein the second controller is adapted to output the signal to adjust environmental conditions at the remote location.

6. The system of claim 1, wherein the second controller, upon receiving the control signal from the first controller, is adapted to initiate the action by performing a programmed task.

7. The system of claim 6, wherein the programmed task is adjustable at the second controller.

8. The system of claim 6, wherein a parameter of the programmed task is adjustable at the second controller.

9. The system of claim 6, wherein the programmed task includes sorting email.

10. The system of claim 1, wherein the first controller is adapted to compare position information of the wireless communication device to stored position information of remote location and is adapted to determine when the wireless communication device has satisfied the geographic relationship based upon the comparison.

11. The system of claim 1, wherein the wireless communication device is a wireless phone.

12. The system of claim 1, wherein the position information indicating position of the wireless communication device is received from a global positioning system (GPS) within the wireless communication device.

13. The system of claim 1, wherein the position information indicating position of the wireless communication device is received from an assisted global positioning system (assisted GPS).

14. The system of claim 1, wherein the memory stores position information of a plurality of remote locations in association with the information identifying a wireless communication device.

15. The system of claim 14, wherein the first controller is adapted to output a control signal to one of the plurality of remote locations upon receiving information indicating that the position of the wireless communication device is within a designated distance of the one of the plurality of the remote locations.

16. The system of claim 1, wherein the memory stores information identifying a plurality of wireless communication devices in association with position information of the remote location.

17. The system of claim 16, wherein the first controller is adapted to output a signal to the remote location upon receiving a signal indicating that the position of one of the plurality of wireless communication devices is within a designated distance of the remote location.

18. The system of claim 15, wherein the memory stores information identifying a plurality of wireless communication devices in association with position information of at least one of the plurality of remote locations.

19. The system of claim 18, wherein the first controller is adapted to output a control signal to one of the remote locations upon receiving a signal indicating that the position of an associated one of the plurality of wireless communication devices is within a designated distance of the one of the remote locations.

20. The system of claim 1, wherein a telephone number identifies the remote location, and the controller is adapted to output the control signal using the telephone number of the remote location.

21. The system of claim 20, wherein the first controller is adapted to output the control signal to the second controller at the remote location through telephone lines.

22. The system of claim 20, wherein the first controller is adapted to output the control signal to the second controller at the remote location through wireless communication.

23. The system of claim 1, wherein the stored information identifying the wireless communication device includes a telephone number.

24. An apparatus comprising:

a controller, adapted to receive information indicating position of a wireless communications device;

a memory, adapted to store information identifying the wireless communication device and position information of a remote location stored in association with the information identifying the wireless communication device, the controller being adapted to output a control signal to the remote location instructing initiation of an action at the remote location upon received information indicating that the position of the wireless communication device has satisfied a geographic relationship with the remote location.

25. The apparatus of claim 24, wherein the geographic relationship is satisfied when the position of the wireless communication device is within a designated distance of the remote location.

26. The apparatus of claim 24, wherein the controller is adapted to compare position information of the wireless communication device to stored position information of the remote location and is adapted to determine when the wireless communication device has satisfied the geographic relationship.

27. The apparatus of claim 24, wherein the wireless communication device is a wireless phone.

28. The apparatus of claim 24, wherein the position information indicating position of the wireless communication device is received from a global positioning system (GPS) within the wireless communication device.

29. The apparatus of claim 24, wherein the position information indicating position of the wireless communication device is received from an assisted global positioning system (assisted GPS).

30. The apparatus of claim 24, wherein the action initiated at the remote location includes operating a door.

31. The apparatus of claim 24, wherein the action initiated at the remote location includes adjusting environmental conditions at the remote location.

32. The apparatus of claim 24, wherein the action initiated at the remote location includes sorting email.

33. The apparatus of claim 24, wherein the memory stores position information of a plurality of remote locations in association with the information identifying a wireless communication device.

34. The apparatus of claim 33, wherein the controller is adapted to output a control signal to one of the plurality of remote locations upon receiving information indicating that the position of the wireless communication device is within a designated distance of the one of the plurality of the remote locations.

35. The apparatus of claim 24, wherein the memory stores information identifying a plurality of wireless communication devices in association with position information of the remote location.

36. The apparatus of claim 35, wherein the controller is adapted to output a control signal to the remote location upon receiving a signal indicating that the position of one of the plurality of wireless communication devices is within a designated distance of the remote location.

37. The apparatus of claim 34, wherein the memory stores information identifying a plurality of wireless communication devices in association with position information of at least one of the plurality of remote locations.

38. The apparatus of claim 37, wherein the controller is adapted to output a control signal to one of the remote locations upon receiving a signal indicating that the position of an associated one of the plurality of wireless communication devices is within a designated distance of the one of the remote locations.

39. The apparatus of claim 24, wherein a telephone number identifies the remote location, and the controller is adapted to output the control signal using the telephone number of the remote location.

40. The apparatus of claim 39, wherein the controller is adapted to output the control signal to the remote location through telephone lines.

41. The apparatus of claim 39, wherein the controller is adapted to output the control signal to the remote location through wireless communication.

42. The apparatus of claim 24, wherein the stored information identifying the wireless communication device includes a telephone number.

43. The apparatus of claim 24, wherein the control signal adapted to be output to the remote location identifies the action to be initiated.

44. The apparatus of claim 24, wherein the control signal adapted to be output to the remote location does not identify the action to be initiated, the action being variable at the remote location.

45. A method, comprising:
storing position information of a remote location in association with information identifying a wireless communication device;
receiving information indicating a position of the wireless device; and
outputting a control signal to the remote location instructing initiation of an action upon the received information indicating that the position of the wireless communication has satisfied a geographic relationship with the remote location.

46. The method of claim 45, wherein the geographic relationship is satisfied when the wireless communication device is within a designated distance of the remote location.

47. The method of claim 45, further comprising:
comparing the received position information of the wireless communication device to the stored position information of the remote location and outputting the control signal based upon the comparison.

48. The method of claim 45, wherein the information indicating position is received from a wireless phone.

49. The method of claim 45, wherein the action initiated at the remote location includes operating a door.

50. The method of claim 45, wherein the action initiated at the remote location includes adjusting environmental conditions at the remote location.

51. The method of claim 45, wherein the action initiated at the remote location includes sorting email.

52. The method of claim 45, wherein storing includes storing position information of a plurality of remote locations in association with information identifying a wireless communication device.

53. The method of claim 52, wherein outputting includes outputting a control signal to one of the plurality of remote locations upon receiving information indicating that the position of the wireless communication device is within a designated distance of the one of the plurality of the remote locations.

54. The method of claim 45, wherein the information identifying a wireless communication device includes a telephone number.

55. The method of claim 45, wherein a telephone number of the remote location is stored in association with the position information and information identifying the wireless communication device.

56. The method of claim 55, wherein the control signal is output to the remote location through telephone lines.

57. The method of claim 55, wherein the control signal is output to the remote location through wireless communication.

58. The method of claim 45, further comprising:
initiating the action at the remote location upon receiving the output control signal.

59. The method of claim 45, further comprising:
outputting a signal to a controller to operate a door at the remote location upon receiving the output control signal.

60. The method of claim 45, further comprising:
outputting a signal to a control device to adjust environmental conditions at the remote location upon receiving the output control signal.

61. The method of claim 45, further comprising:
sorting email at the remote location upon receiving the output control signal.

62. An apparatus comprising:
a memory, adapted to store information identifying a wireless communication device and position information of a remote location stored in association with the information identifying the wireless communication device; and
a controller, adapted to output a control signal to the remote location instructing initiation of an action at the remote location upon determining that a position of the wireless communication device has satisfied a geographic relationship with the remote location.

63. The apparatus of claim 62, wherein the position of the wireless communication device is determined at the controller through triangulation.

64. The apparatus of claim 62, wherein the geographic relationship is satisfied when the position of the wireless communication device is within a designated distance of the remote location.

* * * * *